(12) United States Patent
Yang et al.

(10) Patent No.: US 8,667,850 B2
(45) Date of Patent: Mar. 11, 2014

(54) BIDIRECTIONAL WIND PRESSURE DETECTING APPARATUS

(76) Inventors: Seung Duk Yang, Gyeonggi-do (KR); Seong Jun Yang, Gyeonggi-do (KR)

(*) Notice: Subject to any disclaimer, the term of this patent is extended or adjusted under 35 U.S.C. 154(b) by 179 days.

(21) Appl. No.: 13/335,766

(22) Filed: Dec. 22, 2011

(65) Prior Publication Data
US 2012/0260739 A1 Oct. 18, 2012

(30) Foreign Application Priority Data
Apr. 13, 2011 (KR) .................. 10-2011-0034066

(51) Int. Cl.
*G01L 7/00* (2006.01)
*G01W 1/00* (2006.01)

(52) U.S. Cl.
USPC .......................... 73/756; 73/170.01

(58) Field of Classification Search
None
See application file for complete search history.

(56) References Cited

U.S. PATENT DOCUMENTS 5,627,311 A * 5/1997 Nakaya et al. ............ 73/147
2005/0250434 A1 11/2005 Kim
2009/0075581 A1 * 3/2009 Van Heeswijk et al. ..... 454/239

FOREIGN PATENT DOCUMENTS

KR 100674180 B1 1/2007

* cited by examiner

*Primary Examiner* — Andre Allen
(74) *Attorney, Agent, or Firm* — Hammer & Associates, P.C.

(57) ABSTRACT

Provided is a measuring apparatus capable of measuring a wind pressure, and in particular, a bidirectional wind pressure detecting apparatus having wind pressure sensors installed at an air introduction port and an air ejection port, respectively, to measure a wind pressure regardless of a direction of the air.

8 Claims, 5 Drawing Sheets

BIDIRECTIONAL WIND PRESSURE DETECTING APPARATUS

CROSS-REFERENCE TO RELATED APPLICATION

This application claims priority to and the benefit of Korean Patent Application No. 2011-0034066, filed Apr. 13, 2011, the disclosure of which is incorporated herein by reference in its entirety.

BACKGROUND

1. Field of the Invention

The present invention relates to a measuring apparatus capable of measuring a wind pressure, and more particularly, to a bidirectional wind pressure detecting apparatus including wind pressure sensors installed at introduction and discharge ports, through which air is introduced and discharged, to measure a wind pressure even when a direction of the wind is reversed.

2. Discussion of Related Art

In general, as is well known in the art, a freezing and refrigerating apparatus includes a compressor configured to compress a refrigerant, a condensing heat exchanger and a condensing fan configured to condense a high temperature and high pressure refrigerant compressed by the compressor into a liquid refrigerant state, an expansion valve configured to expand the liquid refrigerant condensed from the condensing heat exchanger and change the refrigerant into a two-phase state of a liquid phase and a gas phase, and an evaporation heat exchanger and an evaporation fan configured to evaporate the two-phase refrigerant expanded through the expansion valve.

Here, since an exchange operation in the evaporation heat exchanger absorbs heat from the suctioned air, a temperature difference occurs between the inside and the outside of the evaporation heat exchanger.

When the temperature difference between the inside and the outside of a forced circulation evaporation heat exchanger 6 is above a certain level, frost formation, in which an outer wall of the evaporation heat exchanger is covered with frost, occurs.

Since such a frost layer acts not only as a heat resistor configured to prevent heat transfer between air and a refrigerant but also to increase a system resistance of the air by blocking a flow path of the air passing through the evaporation heat exchanger, an air volume introduced into the evaporation heat exchanger 6 is reduced to decrease an air-side heat transfer coefficient of the evaporation heat exchanger and to cause a reduction in heat transfer of the evaporation heat exchanger.

A defrosting operation may be performed to flow the refrigerant in an opposite direction of a normal operation, or a separate electric heater installed around the evaporation heat exchanger covered with frost may be operated to prevent generation of such a problem.

In the related art, a wind pressure detecting apparatus 20 shown in FIGS. 1 to 4 is used to detect such a defrosting start point.

FIG. 1 is a schematic side view showing the conventional wind pressure detecting apparatus 20 installed at an evaporation heat exchanger 11 of a freezing and refrigerating apparatus and a freezing apparatus. The wind pressure detecting apparatus 20 is installed at a forced circulation evaporation heat exchanger 11 provided with a fan 12.

Here, the defrosting start point is detected by the wind pressure detecting apparatus 20.

The wind pressure detecting apparatus 20 is installed at the evaporation heat exchanger 11 of the freezing and refrigerating apparatus and the freezing apparatus to detect a variation in wind pressure caused by the fan 12, performing a function of activating a defrosting operation.

As shown in FIGS. 2 and 3, the wind pressure detecting apparatus 20 includes a housing 21, a wind pressure sensor 22 and an operation plate 23.

That is, when frost formation of the forced circulation evaporation heat exchanger 11 applies a load to the fan 12 and air flow in the forced circulation evaporation heat exchanger 11 is reduced, external air is introduced into the forced circulation evaporation heat exchanger 11, and at this time, the wind pressure sensor 22 is operated by the operation plate 23.

The operation plate 23 is installed in the housing 21 and connected to the wind pressure sensor 22. When external air is introduced into the housing 21, the operation plate 23 is pushed toward the wind pressure sensor 22 by the air flow to operate the wind pressure sensor 22.

Since the conventional wind pressure detecting apparatus is disclosed in detail in Korean Patent No. 674180, overlapping description will be omitted.

However, the conventional wind pressure detecting apparatus 20 can be operated only when the air introduced from the outside is in one direction.

That is, as shown in FIG. 1, only when the air is introduced from a right side to a left side of the drawing, is the operation plate 23 operated to activate the wind pressure sensor 22.

However, as shown in FIG. 1, while the air flows from the right side to the left side of the operation plate 23 in the case of the forced circulation evaporation heat exchanger 11, the air may flow in a reversed direction according to embodiments.

That is, as shown in FIG. 4, when the forced circulation evaporation heat exchanger 11 is installed in the reversed direction, the air flows in the opposite direction of the direction that can be measured by the conventional wind pressure detecting apparatus 20, and thus the wind pressure cannot be measured.

Accordingly, since the conventional wind pressure detecting apparatus 20 cannot detect a wind pressure when the forced circulation evaporation heat exchanger 11 is installed in the reversed direction, an additional wind pressure detecting apparatus 20 must be installed to detect a wind pressure of the air flow in the reversed direction.

In addition, since the conventional wind pressure detecting apparatus 20 includes a heater disposed at the outside thereof, the temperature in the wind pressure detecting apparatus 20 cannot be easily controlled.

SUMMARY OF THE INVENTION

The present invention is directed to provide a bidirectional wind pressure detecting apparatus capable of measuring a wind pressure even when a direction of air introduced into and discharged from a housing is reversed by installing wind pressure sensors at an air introduction region and an air ejection region of the housing, and easily controlling the temperature in the wind pressure detecting apparatus using a heater installed therein.

One aspect of the present invention provides a bidirectional wind pressure detecting apparatus including wind pressure sensors SW configured to turn on/off a switch SC using an operation plate D operated by a wind pressure to measure the wind pressure, and a housing 110 in which the wind pressure sensors SW are installed, wherein the wind pressure sensors SW are installed at an air introduction region and an air ejection region of the housing 110, respectively, so that the wind pressure can be measured regardless of a direction of the air introduced into and ejected from the housing 110.

In addition, another aspect of the present invention provides a bidirectional wind pressure detecting apparatus including a wind pressure sensor SW configured to turn on/off a switch SC using an operation plate D operated by a wind pressure to measure the wind pressure, and a housing 110 in which the wind pressure sensor SW is installed, wherein the housing 110 includes a hollow housing main body 111, and a first port 114 and a second port 115 formed at one side surface of the housing main body 111 and through which air is introduced and ejected, and the wind pressure sensor SW includes a first wind pressure sensor 120 and a second wind pressure sensor 130 installed at the first port 114 and the second port 114, respectively, so that the wind pressure can be measured regardless of a direction of the air introduced into and ejected from the housing 110.

Here, the bidirectional wind pressure detecting apparatus may further include a heater 180 installed in the housing 110 to uniformly maintain the temperature of the wind pressure sensor SW, and a heater control unit BM configured to control the heater 180.

In addition, the heater control unit BM may include a heater operation control unit 160 configured to operate the heater 180 when the temperature in the housing 110 is within a certain range and stop an operation of the heater 180 when the temperature exceeds the certain range, and a heater operation cutoff unit 170 configured to cut a power supply to the heater 180 when the temperature in the housing 110 exceeds the certain range.

Further, the heater control unit BM may be formed of a bio-metal.

Furthermore, the bidirectional wind pressure detecting apparatus may further include a support plate 112 installed in the housing main body 111 in a horizontal direction, wherein the wind pressure sensor SW and the control unit BM are mounted on the support plate 112, and the heater 180 is mounted on a bottom surface of the support plate 112.

In addition, the bidirectional wind pressure detecting apparatus may further include a flow rate adjusting unit 190 installed at the first port 114, wherein the first port 114 may include a plurality of openings 114a formed in a longitudinal end surface of the housing main body 111 having a hollow cylindrical shape at predetermined intervals in a circumferential direction thereof, and a shielding unit 114b formed between the openings 114a, and the flow rate adjusting unit 190 may include an adjusting unit main body 191 having a disc shape and rotatably mounted on the first port 114, a plurality of openings 191a formed at the adjusting unit main body 191 at predetermined intervals in a circumferential direction thereof, and a shielding unit 191b formed between the openings 191a.

Further, the wind pressure sensor SW may include a switch SC configured to generate and send a signal due to contact with the operation plate D, an operation arm SW2 having a rod shape, rotatably mounted on the switch SC at one side thereof to be resiliently deformed in an introduction or ejection direction of the air, and on which the operation plate D is mounted, and a contact unit SW1 pressed by the operation arm SW2 to operate the switch SC, and the operation plate D may include an operation plate main body D1 having a disc shape and configured to contact the air, and a mounting unit D2 formed at one side of the operation plate main body D1 and on which the operation arm SW2 is mounted.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, an embodiment of the present invention will be described in detail with reference to FIGS. 5 to 7.

Embodiment

A wind pressure detecting apparatus of the present invention includes wind pressure sensors SW configured to detect a wind pressure by turning on/off a switch SC using an operation plate D operated by the wind pressure, and a housing 110 at which the wind pressure sensor is installed.

Here, the wind pressure sensors SW may be installed at an air introduction region and an air ejection region of the housing 110 to measure a wind pressure regardless of a direction of the air introduced into or ejected from the housing 110.

Figure 1:
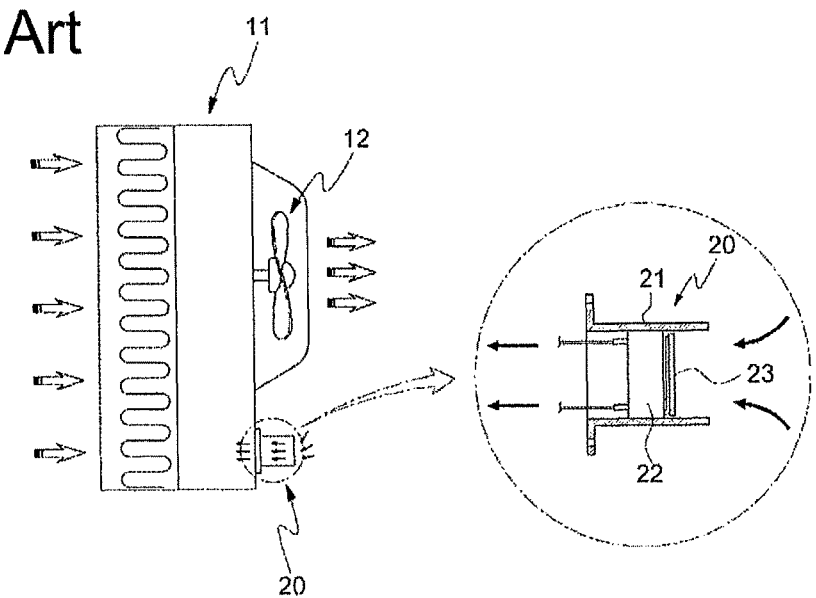
FIGS. 1 to 4 are conceptual views for explaining a conventional wind pressure detecting apparatus.
Figure 2:
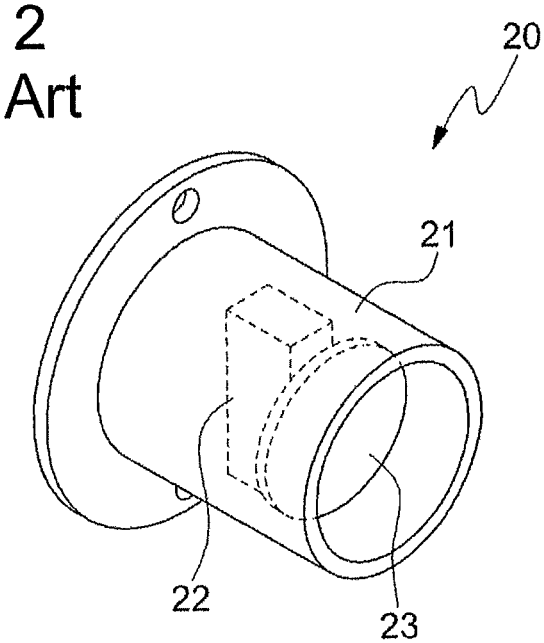
Figure 3:
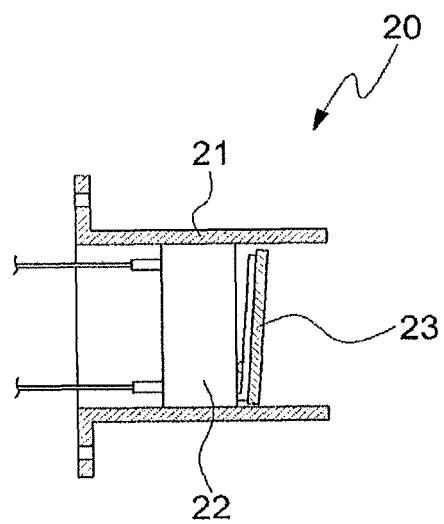
Figure 4:
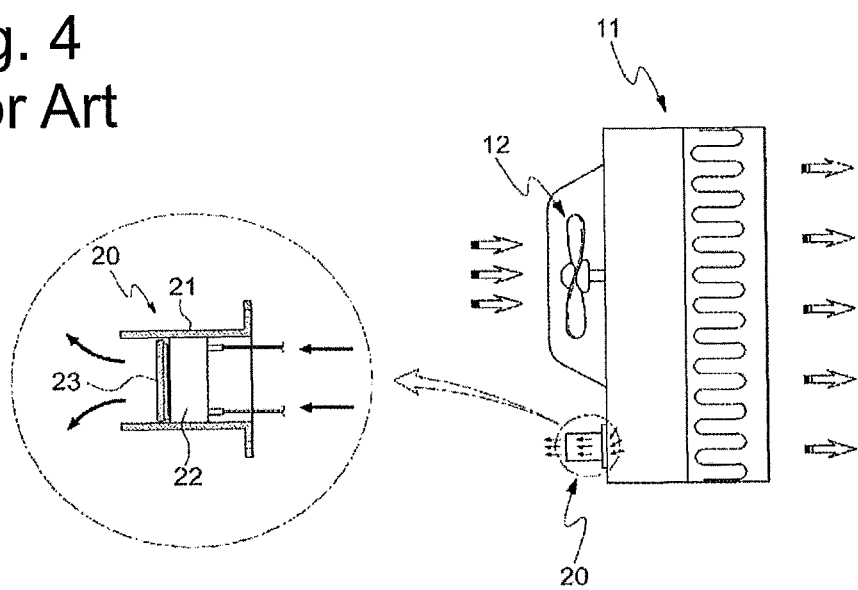
Figure 5:
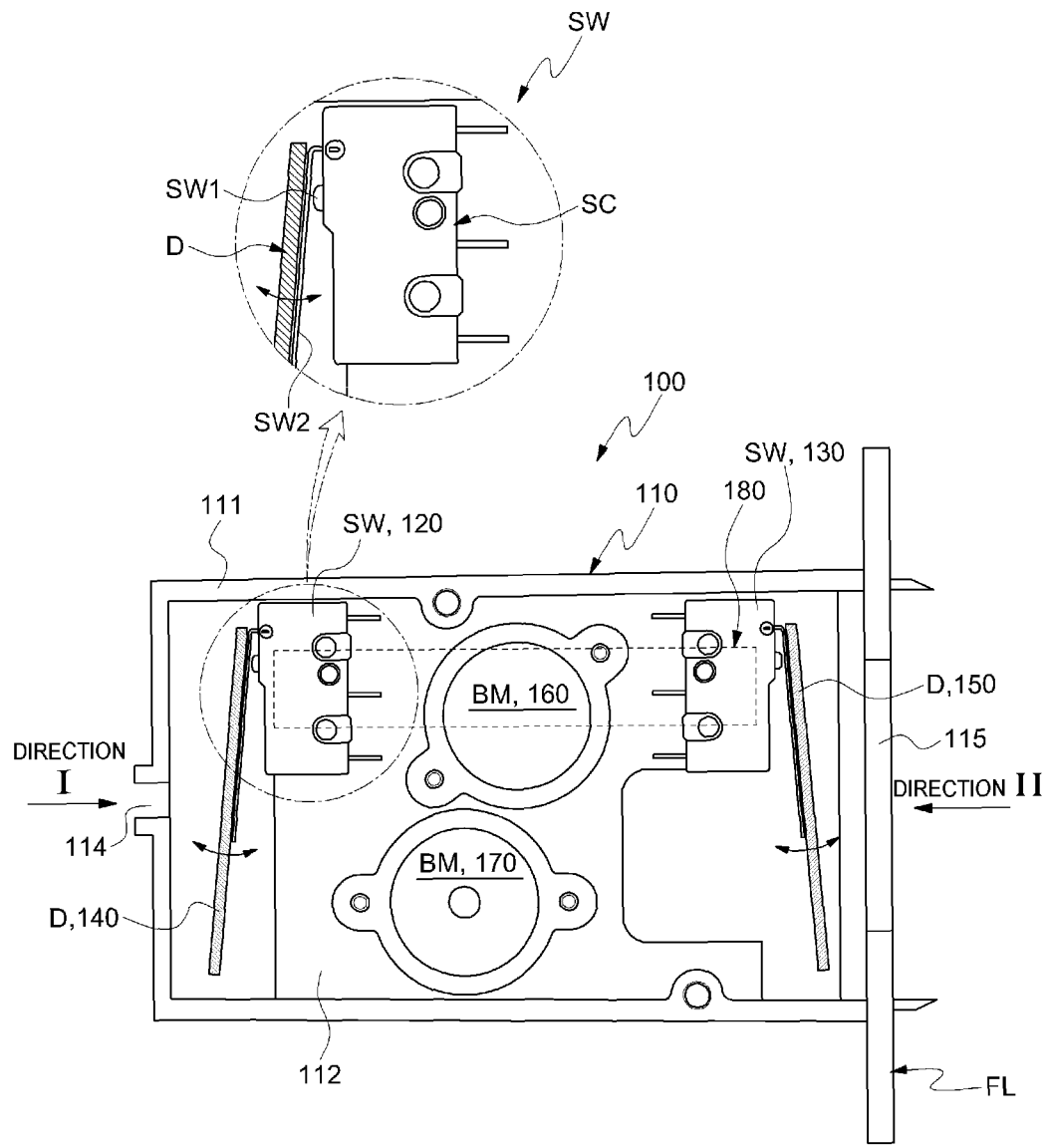
FIG. 5 is a plan view of a wind pressure detecting apparatus of the present invention.

That is, as shown in FIG. 5, one wind pressure sensor SW is disposed at a left side of the housing 110 in the drawing, and the other wind pressure sensor SW is disposed at a right side of the housing 110 in the drawing.

Even when the external air is introduced in Direction I (from a left side to a right side in the drawing) or in Direction II (from the right side to the left side in the drawing), the wind pressure can be measured in all cases.

In the conventional art, as described above, since the air can be measured in only one direction, when the direction of the air is reversed, the conventional wind pressure detecting apparatus should be additionally installed in a reversed direction.

However, in the present invention, since the wind pressure can be measured regardless of the direction of the air, i.e., whether the air flows in a normal direction (Direction I) or a reversed direction (Direction II), there is no need to install an additional wind pressure detecting apparatus as in the conventional art.

Meanwhile, the housing 110 may include a hollow housing main body 111, and a first port 114 and a second port 115 formed at one side surface of the housing main body 111 to introduce and eject the air.

Here, the wind pressure sensor SW may include a first wind pressure sensor 120 and a second wind pressure sensor 130 installed at the first port 114 and the second port 115, respectively, to measure wind pressures in both directions, as described above.

In other words, regardless of the direction of the air introduced into and ejected from the housing 110, i.e., whether the air flows in the normal direction (Direction I) or the reversed direction (Direction II), the wind pressure can be measured.

Meanwhile, in order to normally operate the wind pressure detecting apparatus 100, the wind pressure detecting apparatus 100 must be in an appropriate temperature environment.

For this, in the conventional art, a heater 180 is installed at the outside of the housing to adjust the temperature of the wind pressure detecting apparatus 100.

However, in the conventional art, since the heater 180 is disposed at the outside of the housing, it is difficult to appropriately control the inside of the housing, i.e., the temperature around the wind pressure detecting apparatus.

The present invention solves this problem. The heater 180 (to be described later) is installed in the housing 110 to uniformly maintain the temperature of the wind pressure sensor SW.

Here, as shown in FIG. 5, the heater 180 may be disposed at a bottom surface of the wind pressure sensor SW. In FIG. 5, the heater 180 is shown in dotted lines.

Meanwhile, a heater control unit BM configured to control the heater 180 may be further provided.

In order to maintain the wind pressure sensor SW of the wind pressure detecting apparatus 100 within a certain temperature range, operation of the heater 180 must be maintained or stopped.

For this, the heater control unit BM is provided.

Here, the heater control unit BM may include a heater operation control unit 160 configured to operate the heater 180 when the temperature in the housing 110 is within a certain range and stop an operation of the heater 180 when the temperature departs from the certain range, and a heater operation cutoff unit 170 configured to cut a power supply to the heater when the temperature in the housing 110 departs from the certain range.

That is, the heater operation control unit 160 functions to control the operation or stoppage of the heater 180 such that the temperature in the housing 110 is within the certain range, and as an additional safety apparatus, the heater operation cutoff unit 170 functions to cut the power supply to prevent the operation of the heater 180 when the temperature in the housing 110 departs from the certain range.

For example, when the heater operation control unit 160 is controlled to operate or stop the heater 180 to maintain the temperature in the housing 110 within a range of 30° C. to 40° C. and the temperature in the housing 110 exceeds 45° C. to 55° C., the heater operation cutoff unit 170 cuts the power supplied to the heater 180.

Here, the housing 110 may be formed of aluminum to insulate the inside of the housing 110 from surroundings.

Meanwhile, the heater control unit BM may be formed of a bio-metal.

The bio-metal refers to a metal that remembers a shape at a certain temperature, and is well known in the art.

In the present invention, the heater 180 is controlled using the bio-metal.

Figure 6:
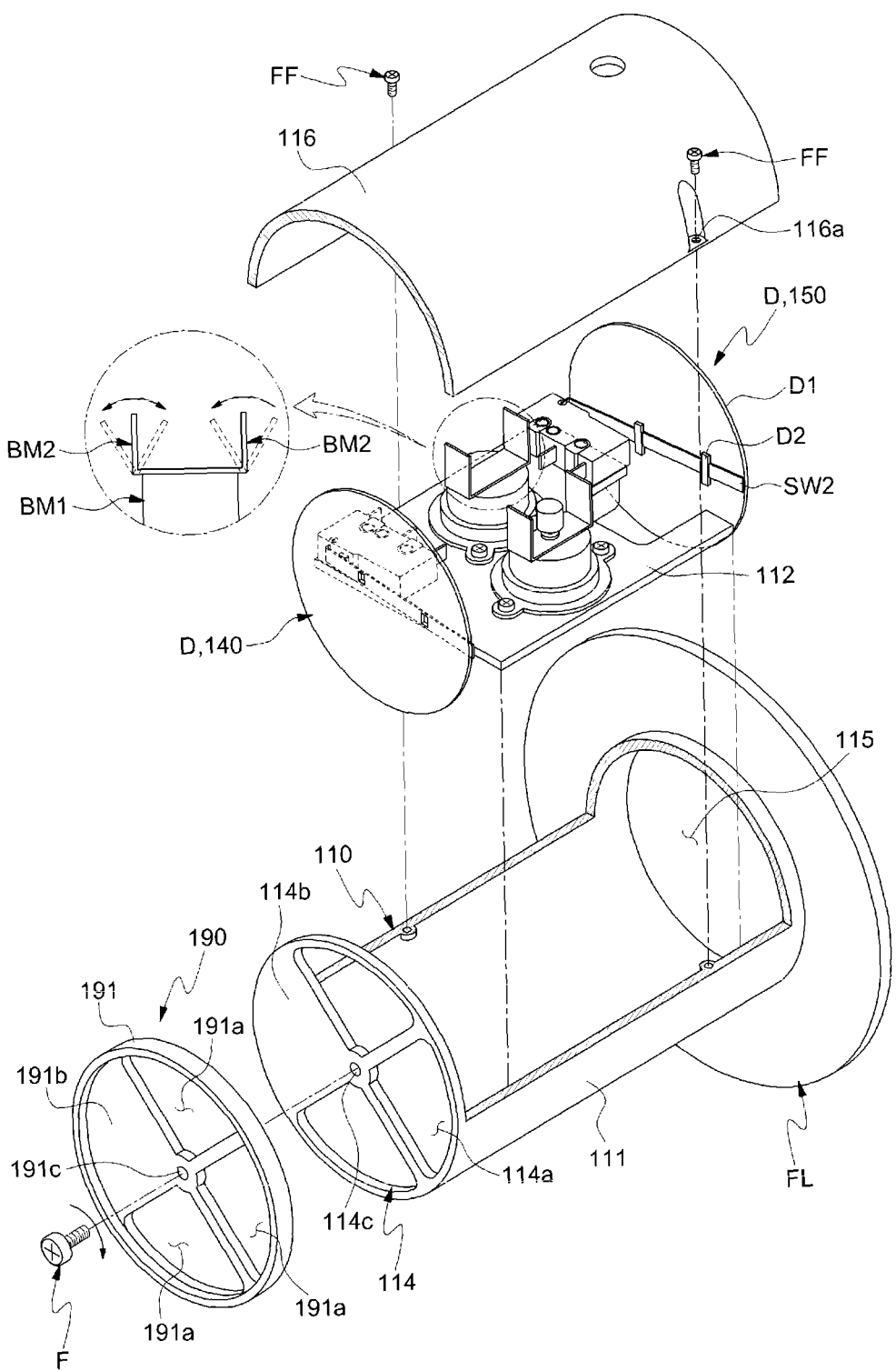
FIG. 6 is an exploded perspective view of the wind pressure detecting apparatus of the present invention.

As shown in FIG. 6, the heater control unit BM using the bio-metal may include a base BM1 mounted on a support plate 112 (to be described later), and a pair of blade pieces BM2 mounted on the base BM1.

Here, the blade pieces BM2 formed of a bio-metal are varied according to a variation in ambient temperature to function as a kind of switch.

Since a switching technique using the bio-metal is well known in the art, detailed description and illustration thereof will be omitted.

Meanwhile, as shown in FIG. 6, the support plate 112 installed in the housing main body 111 in a horizontal direction may be further provided, the wind pressure sensor SW and the control unit BM may be mounted on the support plate 112, and the heater 180 may be mounted on a bottom surface of the support plate 112.

Figure 7:
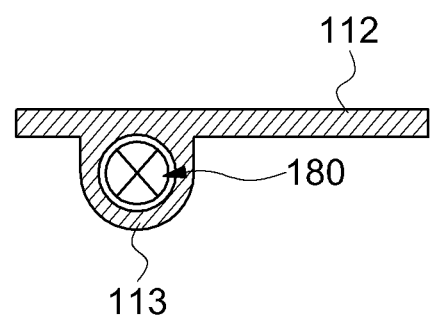
FIG. 7 is a side view of a support plate for explaining a mounting position of a heater of the present invention.

Here, as shown in FIG. 7, a heater holder 113 having a space formed therein may be further provided at the bottom surface of the support plate 112 to mount the heater 180 on the bottom surface of the support plate 112.

Here, the heater 180 may be disposed to have a large length in a longitudinal direction to be disposed at bottom surface sides of the first wind pressure sensor 120 and the second wind pressure sensor 130.

The support plate 112 may have a rectangular plate shape as shown in the drawing.

However, as described above, the support plate 112 is provided for the purpose of supporting the control unit BM, the heater 180 and the wind pressure sensor SW. Of course, the support plate 112 may have different shapes without departing from the spirit of the invention as long as the purpose is satisfied.

Meanwhile, as shown in FIG. 6, the housing 110 may include a housing assembly unit 116 detachably attached thereto, and a fixing hole 116a may be formed in the housing assembly unit 116 so that a fixing tool FF passes through the fixing hole 116a to be fixed to the housing main body 111.

Meanwhile, in FIGS. 5 and 6, a connecting circuit configured to electrically connect the control unit BM, the heater 180 and the wind pressure sensor SW is not shown.

However, since the circuit configured to connect the control unit BM, the heater 180 and the wind pressure sensor SW is well known in the art, detailed illustration thereof will be omitted.

Meanwhile, as shown in FIG. 5, the first port 114 and the second port 115 of the housing 110 may be formed to pass through a left side and a right side of the housing 110.

In addition, a flange FL having a larger diameter than the second port 115 may be formed around the second port 115.

Here, the first port 114 and the second port 115 are provided for the purpose of introducing or ejecting the air as described above. Of course, the first port 114 and the second port 115 may have different shapes without departing from the spirit of the invention as long as the purpose is satisfied.

Meanwhile, a flow rate adjusting unit 190 mounted on the first port 114 may be further provided to adjust a flow rate of the air introduced through the first port 114.

Here, the first port 114 includes a plurality of openings 114a formed at a longitudinal end surface (a left side surface in the drawing) of the hollow cylindrical housing main body 111 at predetermined intervals in a circumferential direction thereof, and a shielding unit 114b formed between the openings 114a.

In addition, the flow rate adjusting unit 190 includes a disc-shaped adjusting unit main body 191 rotatably mounted on the first port 114, a plurality of openings 191a formed at the adjusting unit main body 191 at predetermined intervals in a circumferential direction thereof, and a shielding unit 191b formed between the openings 191a.

A flow rate of the air introduced into the first port 114 through the flow rate adjusting unit 190 can be adjusted.

That is, the openings 191a of the flow rate adjusting unit 190 may align with the openings 114a of the first port 114 to adjust the number of flow paths, through which the air flows, adjusting a flow rate of the air.

Meanwhile, a rotary fixing mechanism F (for example, a bolt or a screw) is installed at a through-hole 191c formed in the adjusting unit main body 191 and a through-hole 114c formed in the first port 114 so that the adjusting unit main body 191 can be rotatably installed.

Meanwhile, the openings 114a of the first port 114 and the openings 191a of the flow rate adjusting unit 190 may have a fan shape.

However, the openings 114a and 191a are provided for the purpose of allowing a flow of the air. Of course, the openings 114a and 191a may have different shapes or numbers without departing from the spirit of the invention as long as the purpose is satisfied.

Meanwhile, as shown in FIG. 5, the wind pressure sensor SW may include a switch SC configured to generate and send a signal due to contact with the operation plate D, an operation arm SW2 having a rod shape, rotatably mounted on the switch SC at one side thereof to be resiliently deformed in an introduction or ejection direction of the air, and on which the operation plate D is mounted, and a contact unit SW1 pressed by the operation arm SW2 to operate the switch SC.

Here, the operation plate D may include an operation plate main body D1 having a disc shape and configured to contact the air, and a mounting unit D2 formed at one side of the operation plate main body D1 and on which the operation arm SW2 is mounted.

That is, when the operation plate D is moved by the air, the operation arm SW2 installed at the operation plate D is interlocked with the operation plate D to be operated.

Here, when the operation arm SW2 presses the contact unit SW1 of the switch SC, the switch SC is operated to generate a predetermined signal.

As the wind pressure sensors SW are installed at the first port 114 and the second port 115, the wind pressure can be measured in both flow directions of the air.

As can be seen from the foregoing, since the wind pressure can be measured regardless of the direction of the air introduced into and ejected from the housing, there is no need to install an additional wind pressure detecting apparatus, and cost can be reduced.

In addition, since the heater is installed in the housing, the temperature around the wind pressure detecting apparatus can be easily controlled.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A bidirectional wind pressure detecting apparatus comprising wind pressure sensors configured to turn on/off a switch using an operation plate operated by a wind pressure to measure the wind pressure, and a housing in which the wind pressure sensors are installed, wherein the wind pressure sensors are installed at an air introduction region and an air ejection region of the housing, respectively, so that the wind pressure is measured regardless of a direction of air introduced into and ejected from the housing.

2. A bidirectional wind pressure detecting apparatus comprising a wind pressure sensor configured to turn on/off a switch using an operation plate operated by a wind pressure to measure the wind pressure, and a housing in which the wind pressure sensor is installed, wherein the housing comprises a hollow housing main body, and a first port and a second port formed at one side surface of the hollow housing main body and through which air is introduced and ejected, and the wind pressure sensor comprises a first wind pressure sensor and a second wind pressure sensor installed at the first port and the second port, respectively, so that the wind pressure is measured regardless of a direction of the air introduced into and ejected from the housing.

3. The bidirectional wind pressure detecting apparatus according to claim 1 or 2, further comprising: a heater installed in the housing to uniformly maintain a temperature of the wind pressure sensors, and a heater control unit configured to control the heater.

4. The bidirectional wind pressure detecting apparatus according to claim 3, wherein the heater control unit comprises: a heater operation control unit configured to operate the heater when a temperature in the housing is within a certain range and stop an operation of the heater when the temperature exceeds the certain range, and a heater operation cutoff unit configured to cut a power supply to the heater (180) when the temperature in the housing exceeds the certain range.

5. The bidirectional wind pressure detecting apparatus according to claim 4, wherein the heater control unit is formed of a bio-metal.

6. The bidirectional wind pressure detecting apparatus according to claim 3, further comprising a support plate installed in a hollow housing main body in a horizontal direction, wherein the wind pressure sensors and the heater control unit are mounted on the support plate, and the heater is mounted on a bottom surface of the support plate.

7. The bidirectional wind pressure detecting apparatus according to claim 2, further comprising a flow rate adjusting unit installed at the first port, wherein the first port comprises a plurality of openings formed in a longitudinal end surface of the hollow housing main body having a hollow cylindrical shape at predetermined intervals in a circumferential direction thereof, and a shielding unit formed between the plurality of openings, and the flow rate adjusting unit comprises an adjusting unit main body having a disc shape and rotatably mounted on the first port, a plurality of openings formed at the adjusting unit main body at predetermined intervals in a circumferential direction thereof, and a shielding unit formed between the plurality of openings.

8. The bidirectional wind pressure detecting apparatus according to claim 2, wherein the wind pressure sensor comprises a switch configured to generate and send a signal due to contact with the operation plate, an operation arm having a rod shape, rotatably mounted on the switch at one side thereof to be resiliently deformed in an introduction or ejection direction of the air, and on which the operation plate is mounted, and a contact unit pressed by the operation arm to operate the switch, and the operation plate comprises an operation plate main body having a disc shape and configured to contact the air, and a mounting unit formed at one side of the operation plate main body and on which the operation arm is mounted.

\* \* \* \* \*